(12) United States Patent
Fu et al.

(10) Patent No.: US 6,381,678 B2
(45) Date of Patent: *Apr. 30, 2002

(54) PROCESSING ORDERED DATA REQUESTS TO A MEMORY

(75) Inventors: John Wai Cheong Fu, Saratoga, CA (US); Dean Ahmad Mulla, Ft. Collins, CO (US); Gregory S. Mathews, Santa Clara, CA (US); Stuart E. Sailer, Campbell, CA (US); Jeng-Jye Shaw, Palo Alto, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,519

(22) Filed: Oct. 30, 1998

(51) Int. Cl.$^7$ .......................... G06F 12/00; G06F 13/00
(52) U.S. Cl. ........................ 711/137; 711/118; 711/154; 712/237
(58) Field of Search .................... 711/3, 117, 118, 711/120, 149, 137, 154, 130, 205, 207; 712/237

(56) References Cited

U.S. PATENT DOCUMENTS

| | | | | |
|---|---|---|---|---|
| 5,247,649 A | * | 9/1993 | Bandoh | 711/130 |
| 5,276,848 A | * | 1/1994 | Gallagher et al. | 711/121 |
| 5,307,477 A | * | 4/1994 | Taylor et al. | 711/3 |
| 5,542,062 A | * | 7/1996 | Taylor et al. | 711/3 |
| 5,544,342 A | * | 8/1996 | Dean | 711/119 |
| 5,553,276 A | * | 9/1996 | Dean | 713/500 |
| 5,699,551 A | * | 12/1997 | Taylor et al. | 711/207 |
| 5,826,052 A | * | 10/1998 | Stiles et al. | 712/205 |
| 6,012,134 A | * | 1/2000 | McInerney et al. | 711/207 |

* cited by examiner

Primary Examiner—Tuan V. Thai
(74) Attorney, Agent, or Firm—Blakely, Sokoloff, Taylor & Zafman LLP

(57) ABSTRACT

A method is provided for requesting data from a memory. The method includes issuing a plurality of data requests to a data request port for the memory. The plurality of data requests includes at least two ordered data requests. The method includes determining if an earlier one of the ordered data requests corresponds to a miss in the memory, and converting a later one of the ordered data requests to a prefetch in response to the earlier one of the ordered data requests corresponding to a miss in the memory. An apparatus includes a memory having at least one pipelined port for receiving data requests. The port is adapted to determine whether an earlier ordered one of the data requests corresponds to a miss in the memory. The port converts a later ordered one of the data requests to a prefetch in response to determining that the earlier ordered one of the data requests corresponds to a miss in the memory.

16 Claims, 10 Drawing Sheets

PROCESSING ORDERED DATA REQUESTS TO A MEMORY

BACKGROUND OF THE INVENTION

1. Field of the Invention

This invention relates generally to the field of data processing systems, and, more particularly, to methods and apparatus for processing ordered data requests to a memory.

2. Description of the Related Art

The demand for quicker and more powerful personal computers has led to many technological advances in the computer industry including the development of faster memories. Historically, the performance of a personal computer has been linked to the speed of accesses to the memory to retrieve data manipulated by instructions and to retrieve data coding for the instructions themselves. The performance of high speed processors was hindered by slow data access times. To expedite data accesses, a fast memory known as "cache memory" was developed.

A cache memory is relatively small and operates at higher speed than a main memory due to either a more direct coupling to the processor or hardware adaptations. The cache memory stores the most recently utilized data blocks such that accessing these blocks is faster than accessing the main memory.

The use of cache memories ordinarily enables the processor to reduce the number of wait periods associated with retrieving data from memory. When the data requester issues a request for data, the cache memory determines whether the data is present in the cache memory. When the data is present in the cache memory, a situation referred to as a cache memory "hit" occurs, and the data is forwarded to the data requester with a relatively small wait. When the data is not present in the cache memory, a situation referred to as a cache memory "miss" occurs, and the cache memory performs several operations. First, the cache memory retrieves the requested data from a secondary memory. Then, the cache memory sends the requested data to the data requester and stores the retrieved data in the cache memory itself. The secondary memory may be a main memory or another cache memory, i.e., a multi-level cache memory. The retrieval of data from the secondary memory is often a much slower operation.

Most cache memories have two subsystems, a "cache tag array" and a "cache data array." The cache tag array stores entries for secondary memory addresses associated with data array entries. The addresses are used to determine whether a data request will result in a cache memory hit. The cache data array stores and delivers data in response to data requests. In multi-level cache memories each cache data array has a corresponding tag array.

Pipelines have further improved the performance of processors by performing processing in parallel and in stages. As opposed to serial processing where all the stages complete the processing of one instruction before beginning the processing of the next instruction, a pipelined device overlaps the stages by processing different instructions at the same time. The effective processing speed of each instruction remains unchanged, but the throughput for instruction processing is increased, because several instructions may be processed by different individual pipeline stages in parallel. Since data requests are repeatedly made to memories, pipelined data-request ports can speed up the processing of data requests.

FIG. 1A is a timing diagram for two serial data requests to a cache memory having a pipelined data-request port. The pipeline has four stages, i.e., a latency of four, and one data request can start at each clock cycle, i.e., a bandwidth of one per clock. The first and second requests are received at t=0 and at t=1, respectively. In the illustrated pipelined data-request port, the hit or miss status of a data request becomes known in the third stage. Thus, there is a lag of three clock cycles between the time at which the port starts to process a data request and the time at which it is known that the request can be completed without a slow data retrieval from a secondary memory.

Data requests can be either "ordered" or "unordered." Ordering dictates the sequential order in which mutually ordered requests should be completed by the hardware. One example of an ordering relation imposes that an earlier issued request, e.g., the first request of FIG. 1A, be completed before a later issued request, e.g., the second request of FIG. 1A. Other ordering relations exist, e.g., simultaneously issued data requests may be ordered with the order of a program. In the following, "earlier" ordered operations are defined to be operations that should complete before "later" ordered operations. "Earlier" and "later" are not limited to program ordering. If two requests are "unordered," hardware may complete the two requests in any order. The ordering of data requests can slow processing of data requests by a pipelined cache memory.

FIGS. 1B is a timing diagram that illustrates why processing ordered data requests may be problematic. The first and second data requests are respective earlier and later ordered requests to the cache memory of FIG. 1A, which are received at t=0 and t=1, respectively. In FIG. 1B, the first request results in a cache memory miss. The first request completes in more than four cycles, because the requested data must be retrieved from a slow secondary memory in a cache memory miss. On the other hand, the second request completes in four cycles, because the second data request results in a cache memory hit. Thus, serially issuing ordered data requests can result in retrievals that violate ordering relations in situations of cache memory misses.

FIG. 1C shows one method for avoiding data retrievals that violate the ordering relationship. Issuance of the second or later ordered data request is delayed until t=3, i.e., until after the hit/miss status of the first request is known. In the illustrated pipelined cache memory, the second request waits three clock cycles until the hit/miss status of the first request is determined. The need to wait for the status of earlier requests reduces the speed for processing ordered data requests, i.e., increases the latency, and lessens the advantages of pipelining.

Multi-porting may further increase the speed of a memory by enabling the processing of several data requests during each clock cycle. FIG. 2A is a timing diagram for a doubled pipelined data-request port of four stages in a cache memory. Two data requests can be received in each clock cycle. Thus, the doubled data-request port may double the throughput for data requests, i.e., the bandwidth is two per clock. Cache memory hits and misses are known at the third stage, i.e., a lag of three clock pulses, a lag that can lead to problems with processing ordered data requests.

FIG. 2B is a timing diagram illustrating one problem with processing ordered requests in the doubled pipelined data-request port of FIG. 2A. The first and second data requests are serially ordered, i.e., the first data request is the earlier request. At t=2, it is determined that the first data request will register a cache memory miss. The second data request registers a cache memory hit and can complete at t=3, i.e., before the earlier first request, because the first data request needs a slow data retrieval from secondary memory to complete. Ordered data requests cannot be processed by such a method in a multi-ported memory, because a later ordered instruction may complete before an earlier request due to a cache memory miss.

The time line of FIG. 2C illustrates a method of processing ordered requests in the doubled pipelined data-request port of FIG. 2A. In response to a cache memory miss for the earlier ordered data request, i.e., the first data request, all pending requests in the pipeline are flushed. The flushing eliminates ordering violations. But, the flushing also reduces the speed of the memory and the advantages of pipelining, because some of the flushed requests may not be ordered.

The present invention is directed to overcoming, or at least reducing the effects of, one or more of the problems set forth above.

SUMMARY OF THE INVENTION

In one aspect of the present invention, a method is provided for requesting data from a memory. The method includes issuing a plurality of data requests to a data request port for the memory. The plurality of data requests includes at least two ordered data requests. The method includes determining if an earlier one of the ordered data requests corresponds to a miss in the memory, and converting a later one of the ordered data requests to a prefetch in response to the earlier one of the ordered data requests corresponding to a miss in the memory.

In another aspect of the present invention, an apparatus is provided. The apparatus includes a memory having at least one pipelined port for receiving data requests. The port is adapted to determine whether an earlier ordered one of the data requests corresponds to a miss in the memory. The port converts a later ordered one of the data requests to a prefetch in response to determining that the earlier ordered one of the data requests corresponds to a miss in the memory.

BRIEF DESCRIPTION OF THE DRAWINGS

Other objects and advantages of the invention will become apparent upon reading the following detailed description and upon reference to the drawings in which.

Figure 1A:
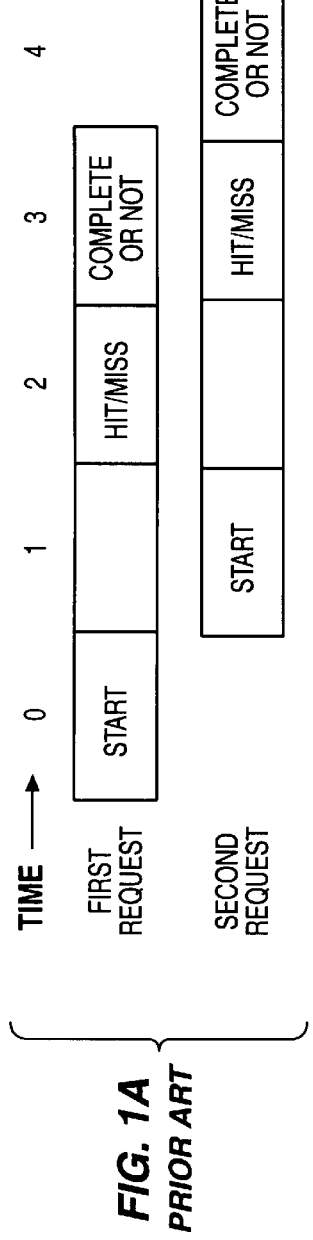
FIG. 1A is a time line illustrating the progress of two sequentially received data requests in a pipelined data-request port of a prior art cache memory.
Figure 1B:
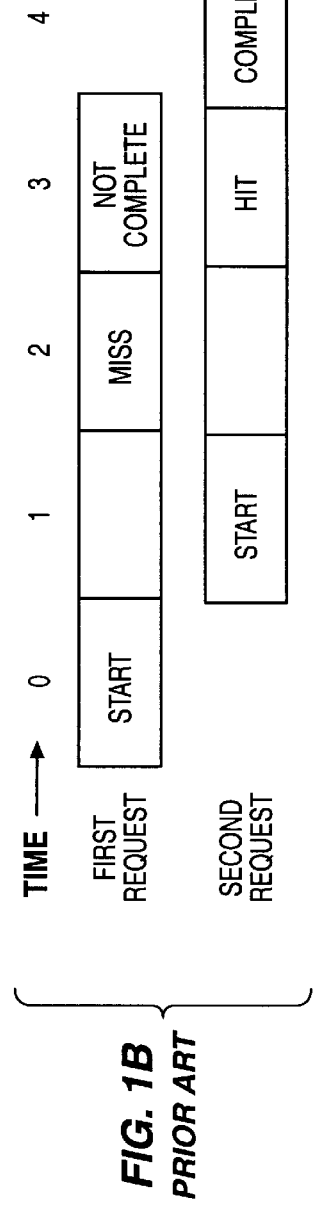
FIG. 1B is a time line illustrating a problem with sequentially processing two "ordered" data requests in the pipelined data-request port of FIG. 1A.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3A:
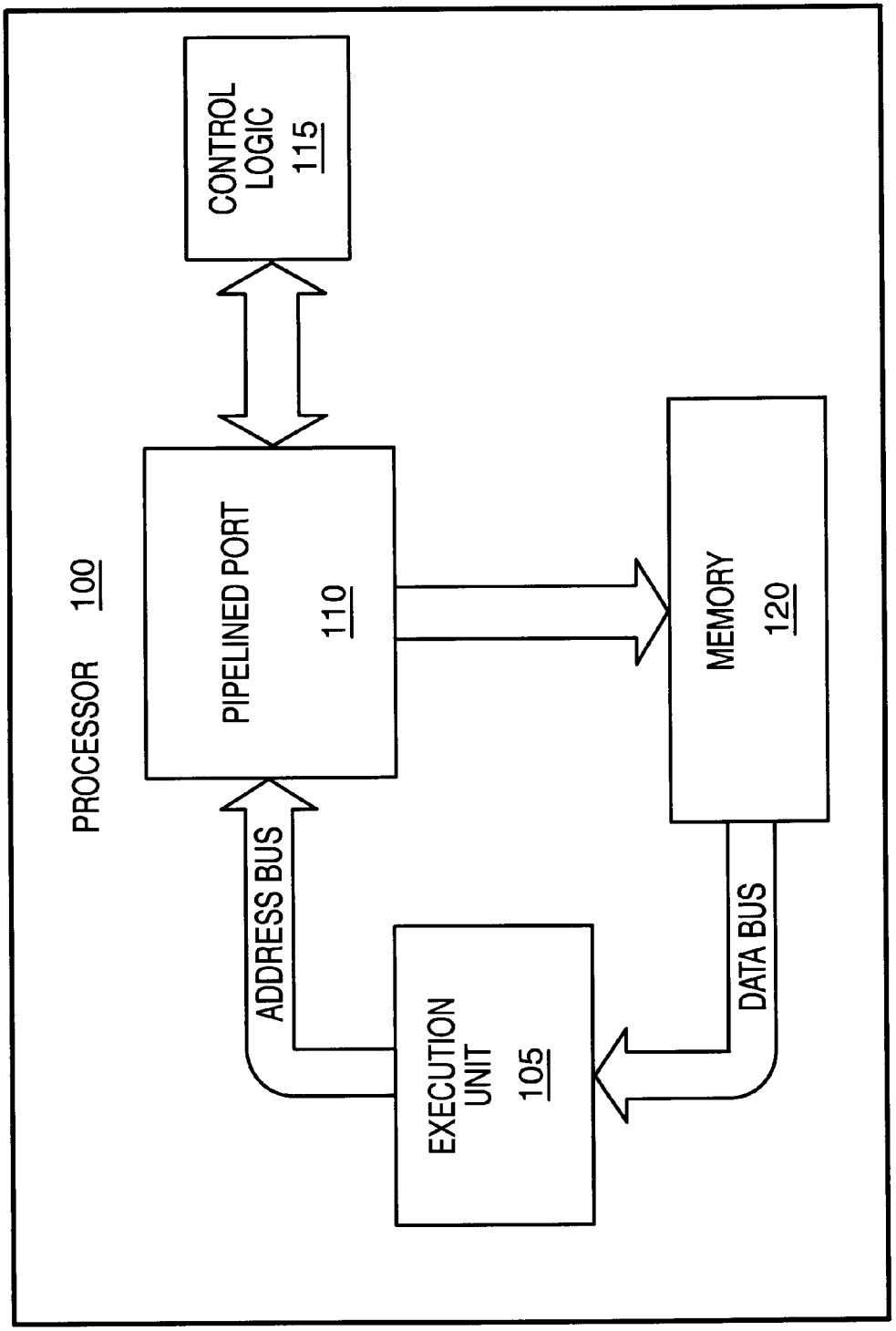
FIG. 3A is a block diagram of an embodiment of an apparatus for processing ordered data requests.

FIG. 3A shows an embodiment of the present invention, which includes a processor 100 having an execution unit 105, a pipelined data-request port 110, control logic 115, and a memory 120. Though the memory 120 of the embodiment of FIG. 3A is a cache memory, alternative embodiments may employ other types of memory. Although the invention is not limited to cache memories, the memory 120 and the corresponding port 110 may be hereinafter illustrated as a cache memory and a pipelined port having a cache tag array, respectively. Furthermore, although not shown in FIG. 3, the control logic 115 may reside, in some alternative embodiments, in the pipelined data-request port 110. The pipelined data-request port 110 may be a multiple data-request port for the cache memory 120.

The execution unit 105 is capable of issuing multiple ordered data requests to the cache memory 120 during one clock cycle. The execution unit 105 expects each ordered data request to complete in the order originally issued to the pipelined port 110. The cache memory 120 may also receive data requests from other execution units (not shown). The other data requests may not be ordered with respect to the data requests from the execution unit 105. The control logic 115 is capable of converting an ordered data request into a prefetch if the pipelined port 110 determines that an earlier data request, ordered with respect to the other ordered request, will register a cache memory miss. In other words, the control logic 115 in the embodiment of FIG. 3 converts a subsequent ordered data request into a prefetch in the event of a cache memory "miss" for an earlier ordered data request.

Still referring to FIG. 3A, a prefetch retrieves the requested data from a secondary memory (not shown) and stores the retrieved data in the primary memory, e.g., the cache memory 120, without forwarding the data to the original data requester, e.g., the execution unit 105. In some embodiments, data requests are only converted to prefetches, as described above, if the data request to be converted is itself determined to be a cache memory miss.

Still referring to FIG. 3A, the cache memory 120 may have a multiple pipelined data request port capable of accepting multiple data requests during each clock cycle. Thus, the execution unit 105 may issue a plurality of ordered data requests to the pipelined port 110 during each clock cycle. For example, the execution unit 105 may issue a plurality of ordered data requests during a first clock cycle and then issue another plurality of ordered data requests during a second clock cycle. The pipelined data-request port 110 may also receive data requests from other execution units (not shown). The other data requests may or may not be ordered with respect to the data requests from the illustrated execution unit 105. Thus, the pipelined port 110 may receive ordered and unordered data requests concurrently. The illustrated embodiment provides for returning the requested information to the execution unit 105 in the order issued, regardless of whether a cache memory "hit" or "miss" occurs while processing the data request.

Figure 4A:
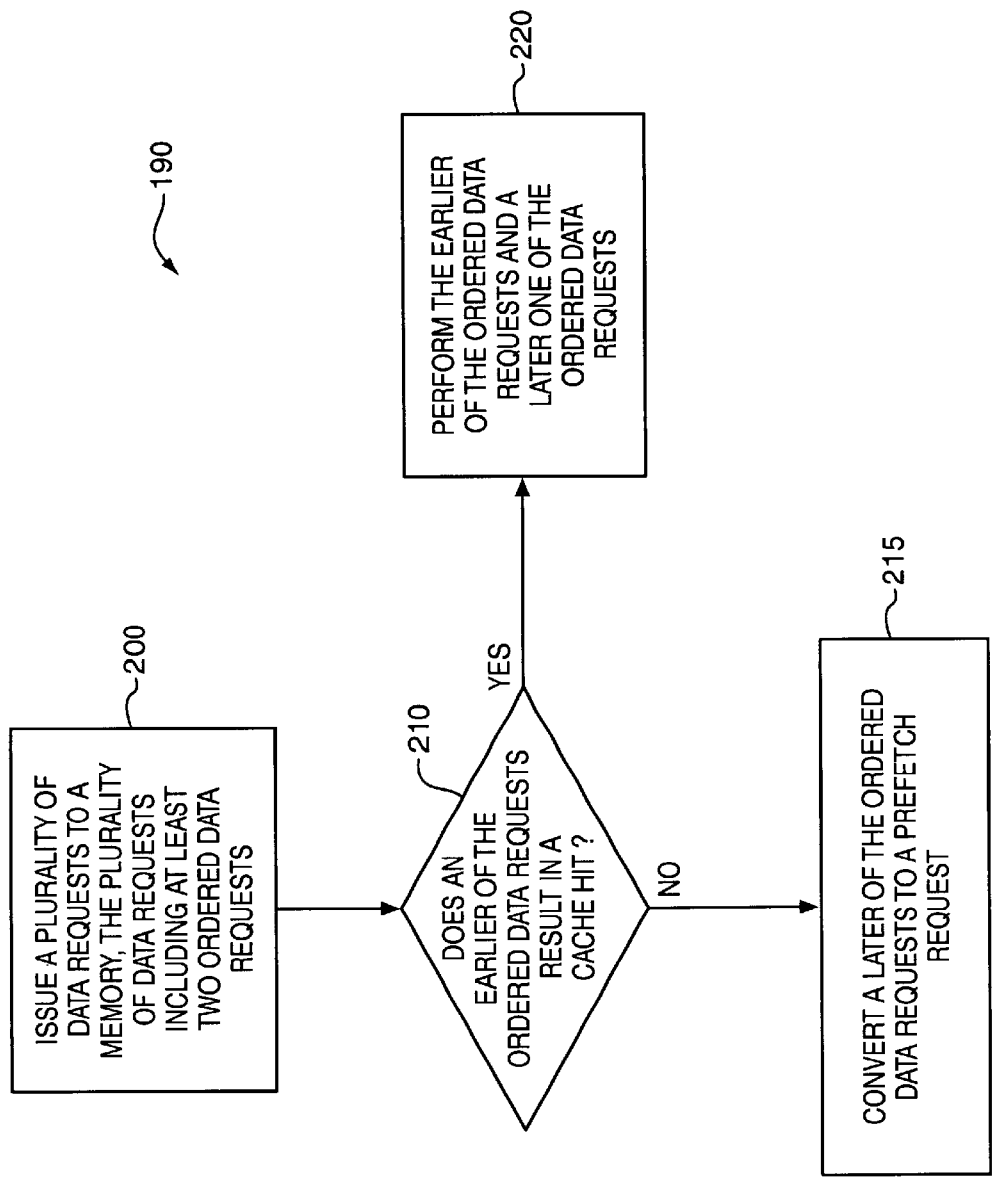
FIG. 4A is flowchart illustrating one embodiment of a method for processing ordered data requests to the memory of FIG. 3A.

FIG. 4A depicts an embodiment of a method 190 for processing data requests, e.g., requests to the memory 120 of FIG. 3A, wherein some of the data requests are ordered with respect to each other. At block 200, a plurality of data requests are issued to the memory 120. The plurality of data requests includes at least two data requests that are ordered with respect to each other. For example, the two data requests may be from the same execution unit, e.g., the execution unit 105 of FIG. 3A. The plurality of data requests can be issued in one or several clock cycles, and may include unordered data requests. At block 210, the pipelined port 110 determines whether an earlier one of the ordered data requests is a memory hit, i.e., whether the data requested is in the memory 120. At block 215, the control logic 115 converts a later one of the ordered data requests to a prefetch if the earlier one of the ordered data requests has been determined to be a cache memory miss. In some embodiments, all data requests, ordered later with respect to the data request determined to be a cache memory miss, are converted to prefetches. At block 220, the pipelined port 110 performs the earlier one and a later one of the ordered data requests to the memory 120 in response to the earlier one of the ordered data requests having been determined to be a memory hit at block 210.

Referring to FIGS. 3A and 4A, a later data request is not converted to a prefetch in response to the cache memory miss of an earlier data request that is unordered with respect to the later data request. For example, a cache memory miss for a data request by a second execution unit (not shown in FIG. 3), does not lead to the conversion of a data request by the execution unit 105 to a prefetch in some embodiments. Nevertheless, data requests from different execution units may be mutually ordered in other embodiments.

Figure 4B:
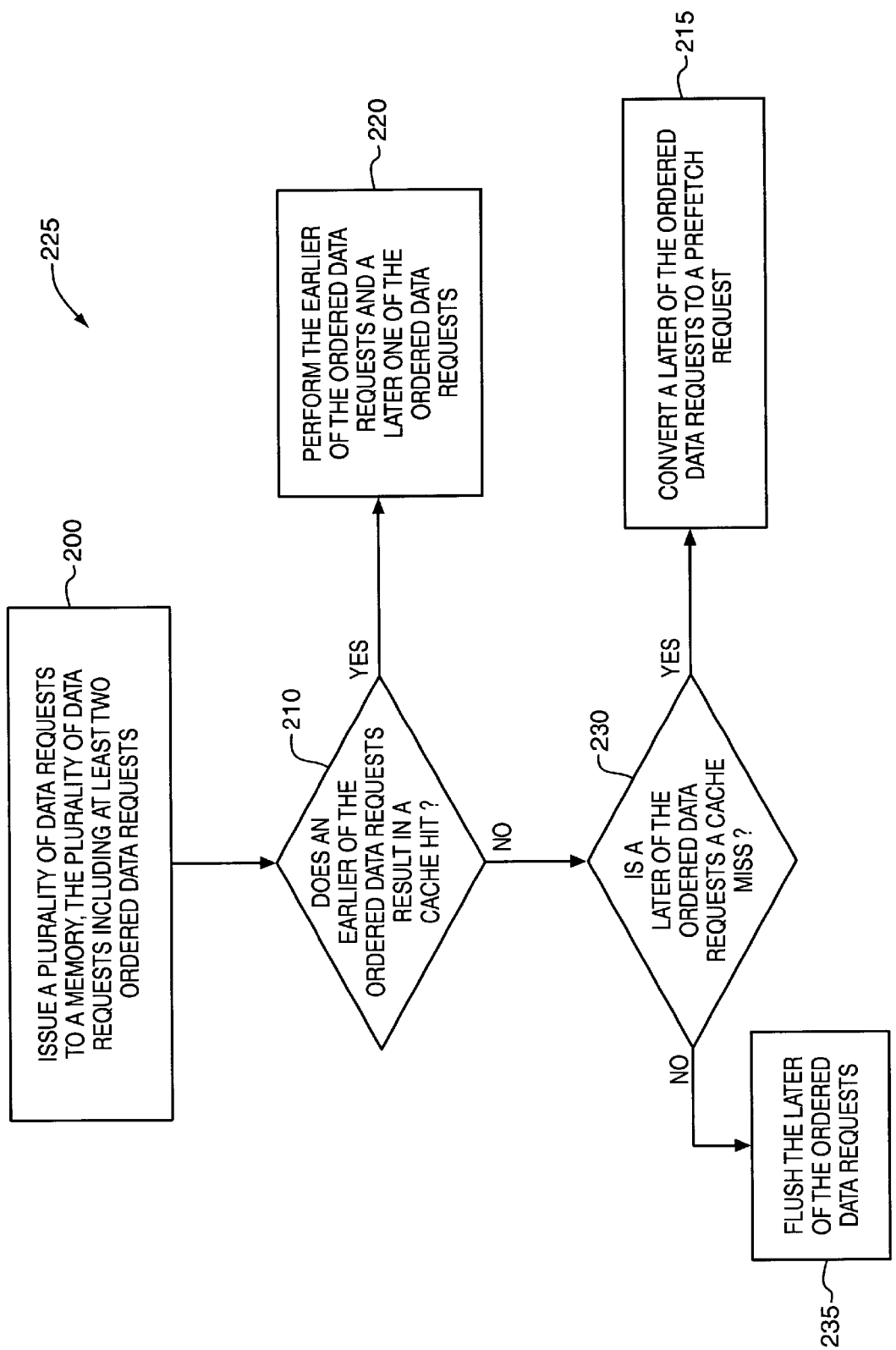
FIG. 4B is a flowchart illustrating a specific embodiment of the method of FIG. 4A.

FIG. 4B illustrates a specific embodiment 225 of the method of FIG. 4A, wherein a later ordered data request, which itself is determined to a cache memory hit, is not be converted to a prefetch. Blocks 200, 210, 215 and 220 have already been described in relation to FIG. 4A. At block 230, the pipelined data-request port 110 determines whether a later one of the ordered data requests is a cache memory hit. At block 235, the pipelined data-request port 110 flushes the later one of the ordered data requests in response to determining that the later one of the ordered data requests are cache memory hit, i.e., without converting these later ordered requests to a prefetches. Blocks 230 and 235 are performed on an individual request basis and may be performed separately for different later ones of the ordered data requests. The flush of block 235 can improve the efficiency of the processor 100 of FIG. 3A because a prefetch is useless for data requests registering a cache memory hit.

Figure 5:
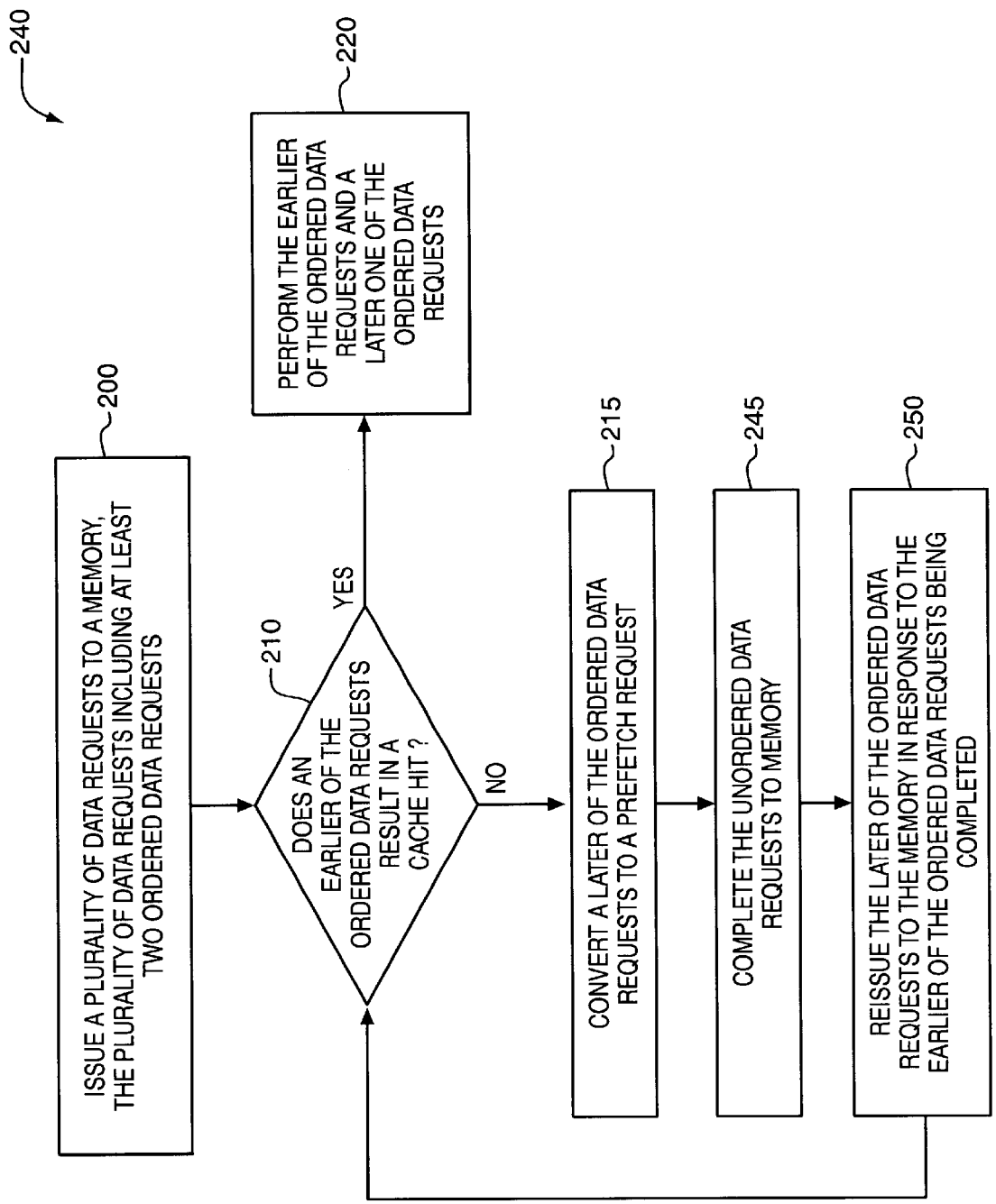
FIG. 5 is a flowchart illustrating an alternate embodiment of a method of processing ordered data requests to the memory of FIG. 3A.

The method 240 of FIG. 5 is a specific embodiment of the method of FIG. 4A. Blocks 200, 210, 215, and 220 have already been described in relation to FIG. 4A. Additionally at block 245, the pipelined port 110 completes data requests that are unordered with respect to the earlier ordered request determined to be a cache memory miss. At block 250, the later ones of the ordered data requests are reissued in response to completion of the earlier ordered request previously determined to be a memory miss at block 210. The later ordered data requests include the request converted to a prefetch at block 215 and also possibly other ordered requests, e.g., flushed requests at block 235 of FIG. 4B. The later ordered requests have to be reissued because they have not yet supplied the requested data to the data requesters, e.g., the execution unit 105. The methods of FIGS. 4A and 5 are repeated each time the execution unit 105 issues ordered data requests to the pipelined port 110.

Figure 1C:
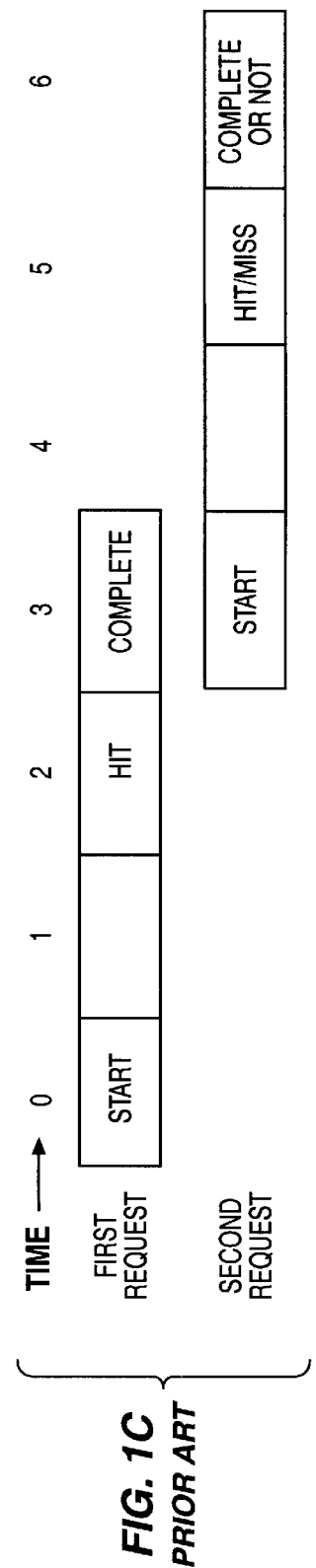
FIG. 1C is a time line illustrating one prior art method of processing "ordered" data requests in the prior art cache memory of FIG. 1A.
Figure 2A:
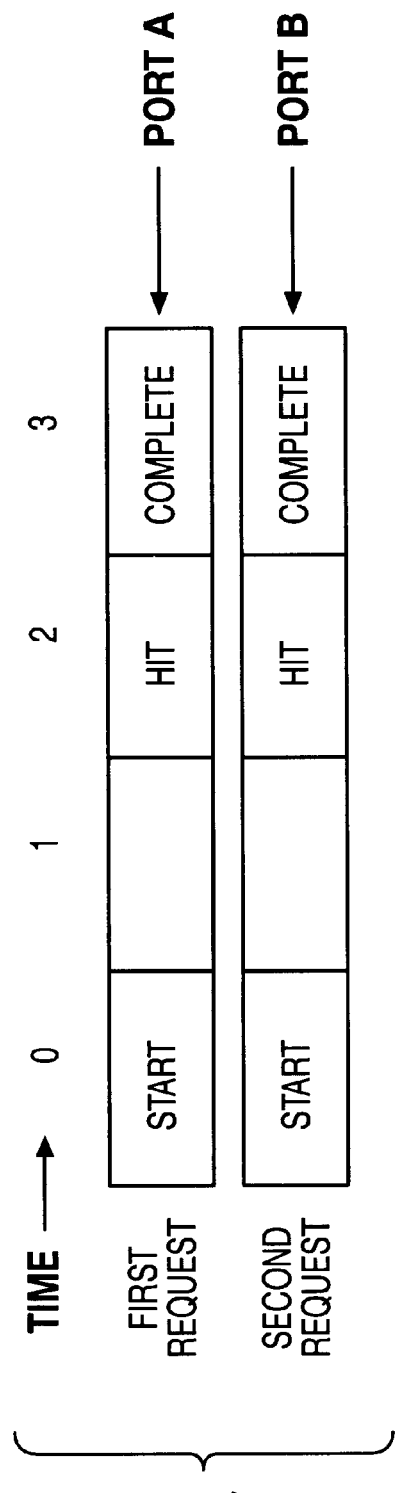
FIG. 2A is a time line illustrating the progress of two data requests in a doubled pipelined data-request port of a prior art cache memory.
Figure 2B:
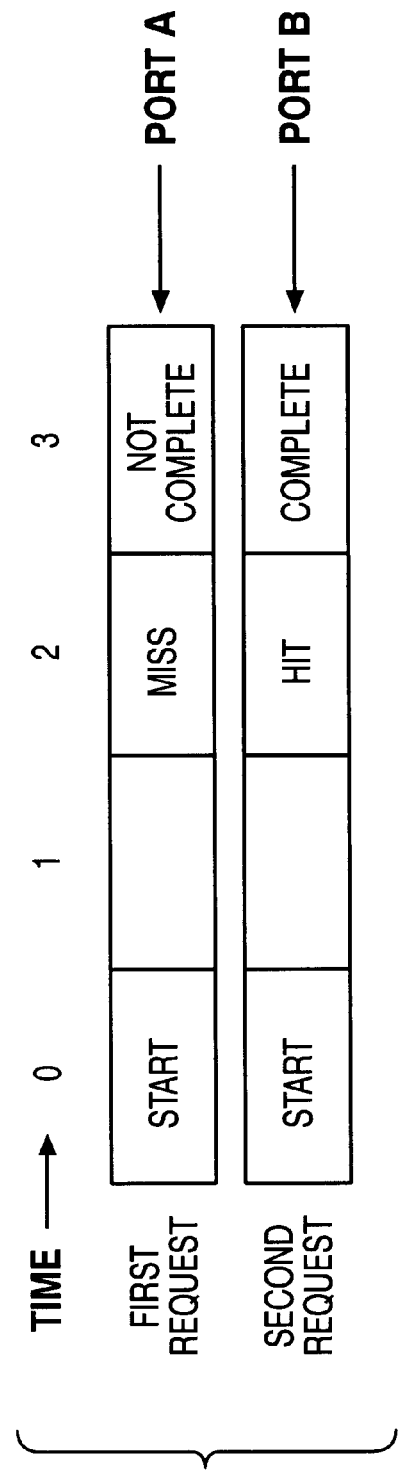
FIG. 2B is a time line illustrating a problem with processing two "ordered" data requests in the prior art cache memory of FIG. 2A.
Figure 2C:
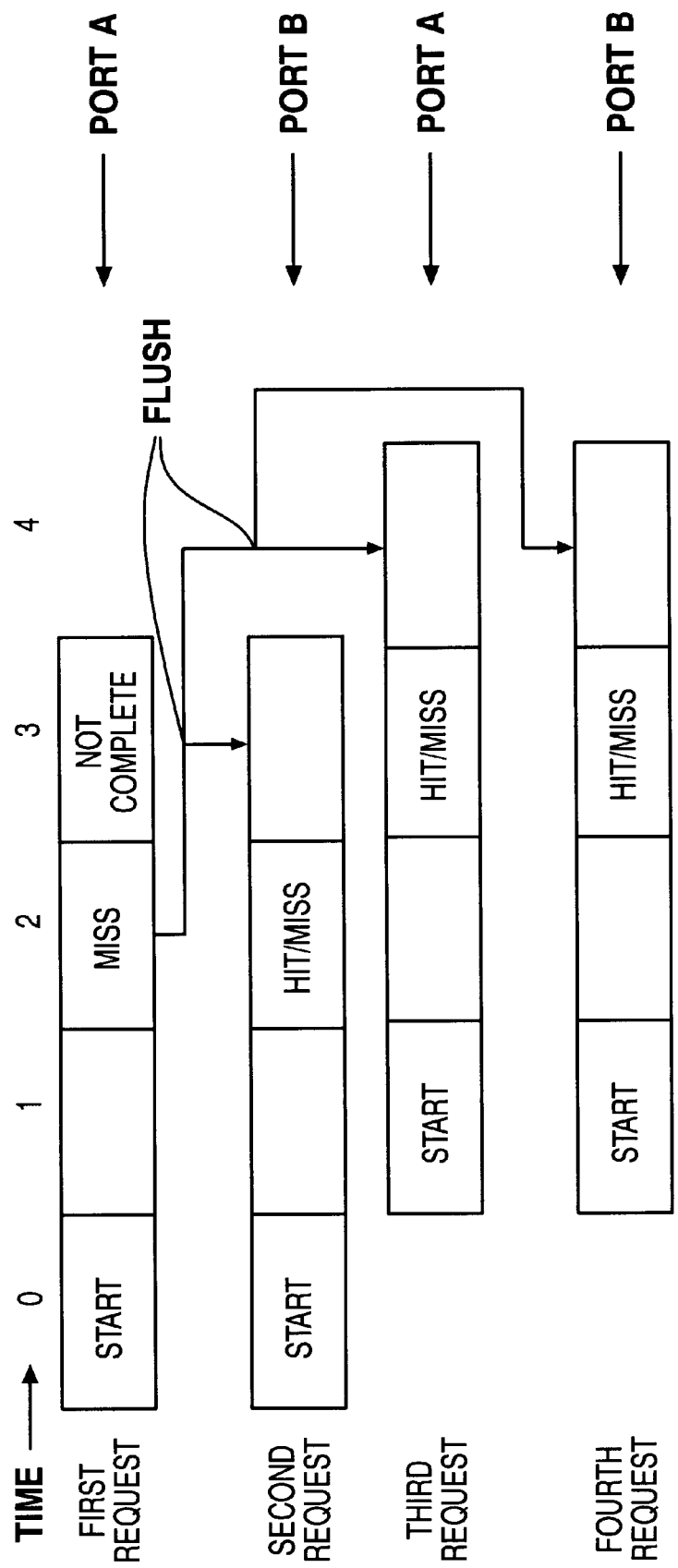
FIG. 2C is a time line illustrating how flushes may be employed to process ordered data requests in the prior art cache memory of FIG. 2A.

Referring to FIGS. 4A, 4B, and 5, the various embodiments may improve the bandwidth and decrease the latency of a cache memory 120. First, ordered data requests are speculatively issued without delaying until earlier ordered requests complete. Second, if an earlier ordered request registers a cache memory miss, later speculatively issued ordered requests are converted into prefetches. The conversions to prefetches reduce latencies when converted data requests are later reissued. Third, if a later data request is not ordered with respect to an earlier data request, the later data request is not flushed in response to the earlier data request registering a memory miss. The methods of FIGS. 4A, 4B, and 5 enable a memory to receive ordered data requests without the delay used by the pipelined port of FIG. 1C and to avoid out-of-order completions in a manner less adverse to bandwidth and latency than the flushing used by the pipelined port of FIG. 2C.

If the first ordered data request is a miss in the cache memory 120 of FIG. 3A, then in accordance with the methods of FIGS. 4A, 4B, and 5 one or more of the remaining later ordered data requests could be converted to prefetches by the pipelined port 110 and the control logic 115. The cache memory pipeline may be flushed, and both the ordered requests that were converted, and the ordered requests that were flushed may be reissued by either the execution unit 105 or the pipelined port 110 itself.

Figure 3B:
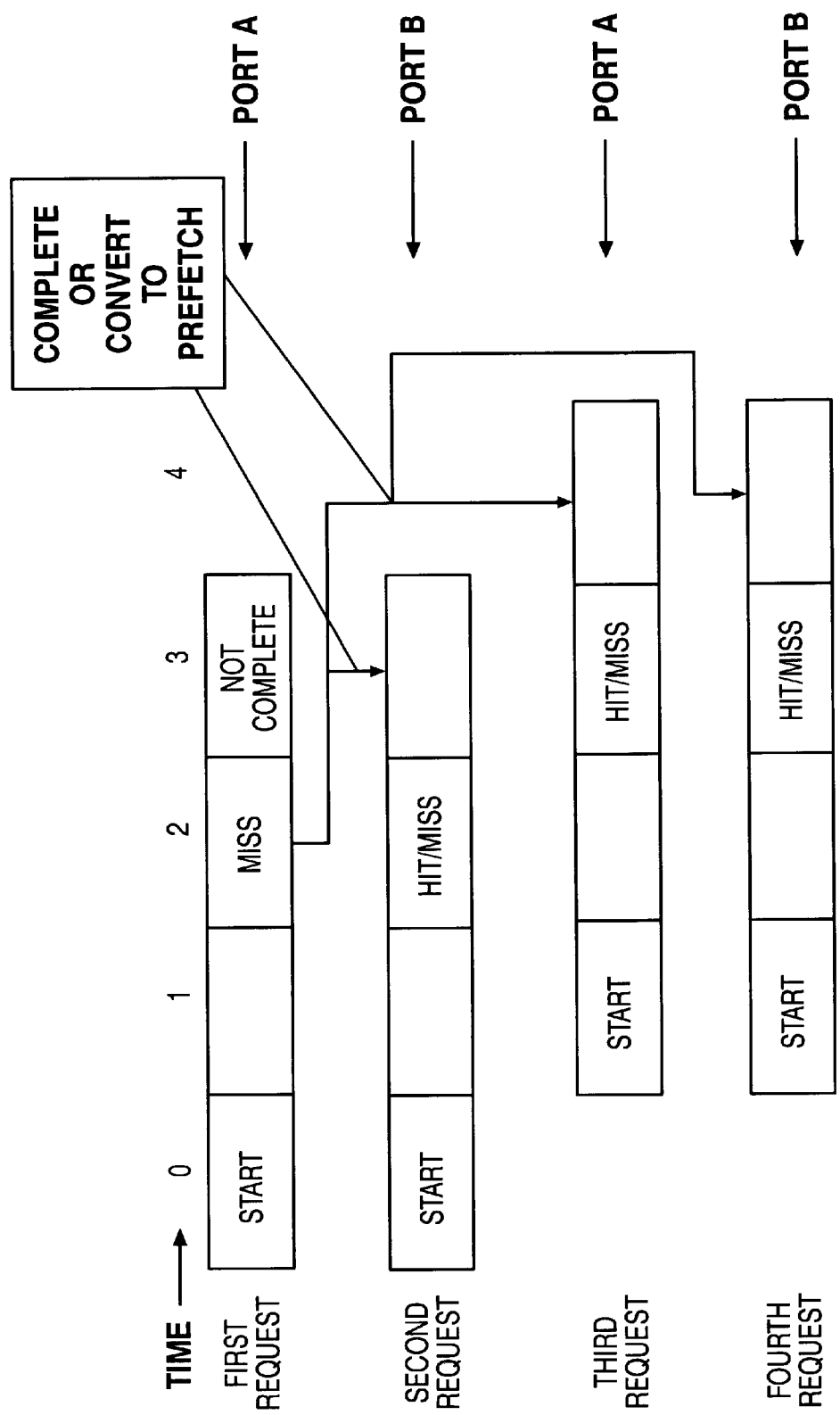
FIG. 3B is a timeline illustrating methods for processing later data requests in response to a memory miss of an earlier ordered data request.

The methods 190 and 225 of FIGS. 4A and 4B can be illustrated by the time line of FIG. 3B. For illustrative purposes only, each clock cycle of pipelined port described by FIG. 3B represents a different stage of a four-stage, dual-ported pipeline in which the memory hit or miss status is determined at the third stage. The first and second data requests are received by the pipelined ports at t=0, and the third and fourth data requests are received at t=1. In the illustrated example, the status of the first data request, an ordered request, is determined to be a miss at t=2. In response to the memory miss of the first data request, the pipelined port converts the later pending requests, which are ordered with respect to the first request, to prefetches and allows the other pending requests, which are unordered with respect to the first request, to complete. Some embodiments flush all ordered request that are known to be memory hits and later than the first request, instead of converting because prefetches are not useful for such data requests—the request data is already in the memory. One embodiment may convert only the second data request to a prefetch because the memory hit or miss status of the yet later third and fourth requests is unknown when the first request is determined to be a memory miss at t=2. In this embodiment the third and fourth requests are flushed from the pipeline when they are ordered with respect to the first data request and then re-issued in response to completion of the first request. Other embodiments convert all ordered requests in earlier pipeline stages to prefetches, e.g., the third and fourth requests, because the memory hit or miss status of such requests is unknown when the miss status of the earlier ordered request, e.g., the first request, at t=2. The invention is also intended to cover other embodiments for converting later ordered data requests to prefetches that which could be constructed by a person of ordinary skill in the art, having the present disclosure without undue experimentation.

Figure 6:
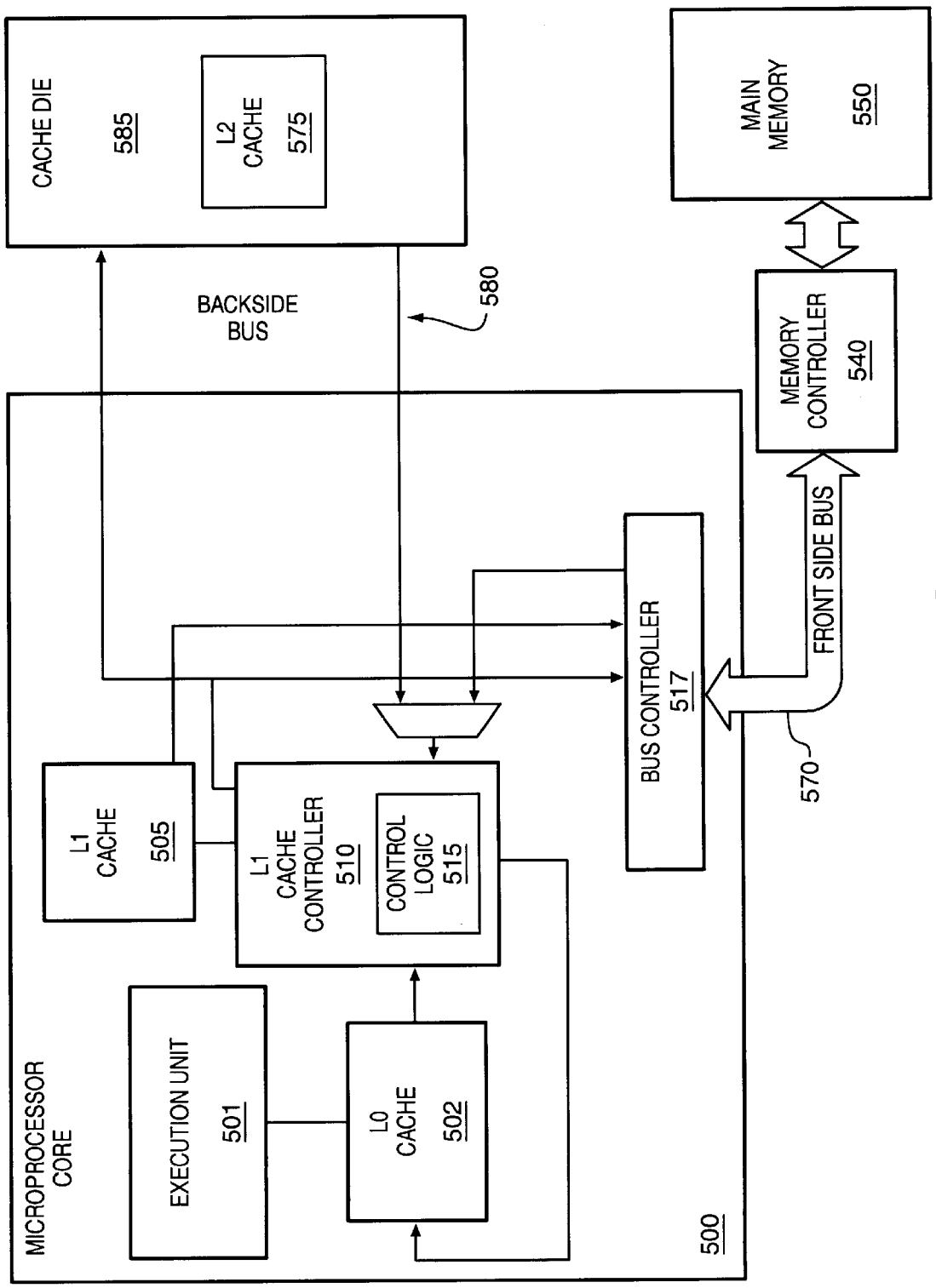
FIG. 6 is a block diagram of an embodiment of an apparatus for processing ordered data requests to a multi-level cache memory system.

FIG. 6 depicts another embodiment having a three-level pipelined cache memory architecture. The processor 500 includes an execution unit 501, a first level cache memory, L0, 502, a second level cache memory, L1, 505, a cache memory controller 510 for the L1 cache memory 505, a control logic 515, and a bus controller 517. The bus controller 517 is coupled to a memory controller 540 of the main memory 550 through a front side bus 570. The processor 500 is coupled to a third level cache memory, L2, 575 over a backside bus 580. The third level cache memory 575 is resident on a cache die 585, and thus resides off the die for the processor 500.

As shown in FIG. 6, the L1 memory cache memory controller 510 comprises the control logic 515 for the pipelined request ports that implement the methods illustrated in FIGS. 4A, 4B, and 5. Using the method of the present invention, the L1 cache memory controller 510 is capable of receiving and processing a plurality of ordered data requests substantially simultaneously, i.e., without having to wait for an earlier ordered request to complete. The cache memory controller and control logic 510, 515 convert a later pending ordered data request to the L1 cache memory 505 to a prefetch of data from the L2 cache memory 575 in response to determining that an earlier ordered data request is a miss in the L1 cache memory 505.

The control logics 115, 515 of FIGS. 3 and 6, used to implement the methods illustrated in FIGS. 4A, 4B, and 5 can be constructed by those skilled in art having the benefit of this disclosure. The control logic 115, 515 may be implemented as hardware or software. In addition, although the control logic 515 in the particular embodiment of FIG. 6 resides in the cache memory controller 510, this is not necessary to the practice of the invention. It may be possible to reduce the cache memory latency of ordered data requests by implementing similar control logic elsewhere in a data processing system, e.g., for ordered data requests to any combination of the L0, L1, and L2 cache memories 502, 510, 575. The present invention for reducing latency and increasing bandwidth for ordered data requests is applicable to any memory architecture and is not limited to the cache memory architectures of FIGS. 3 and 6.

Figure 7:
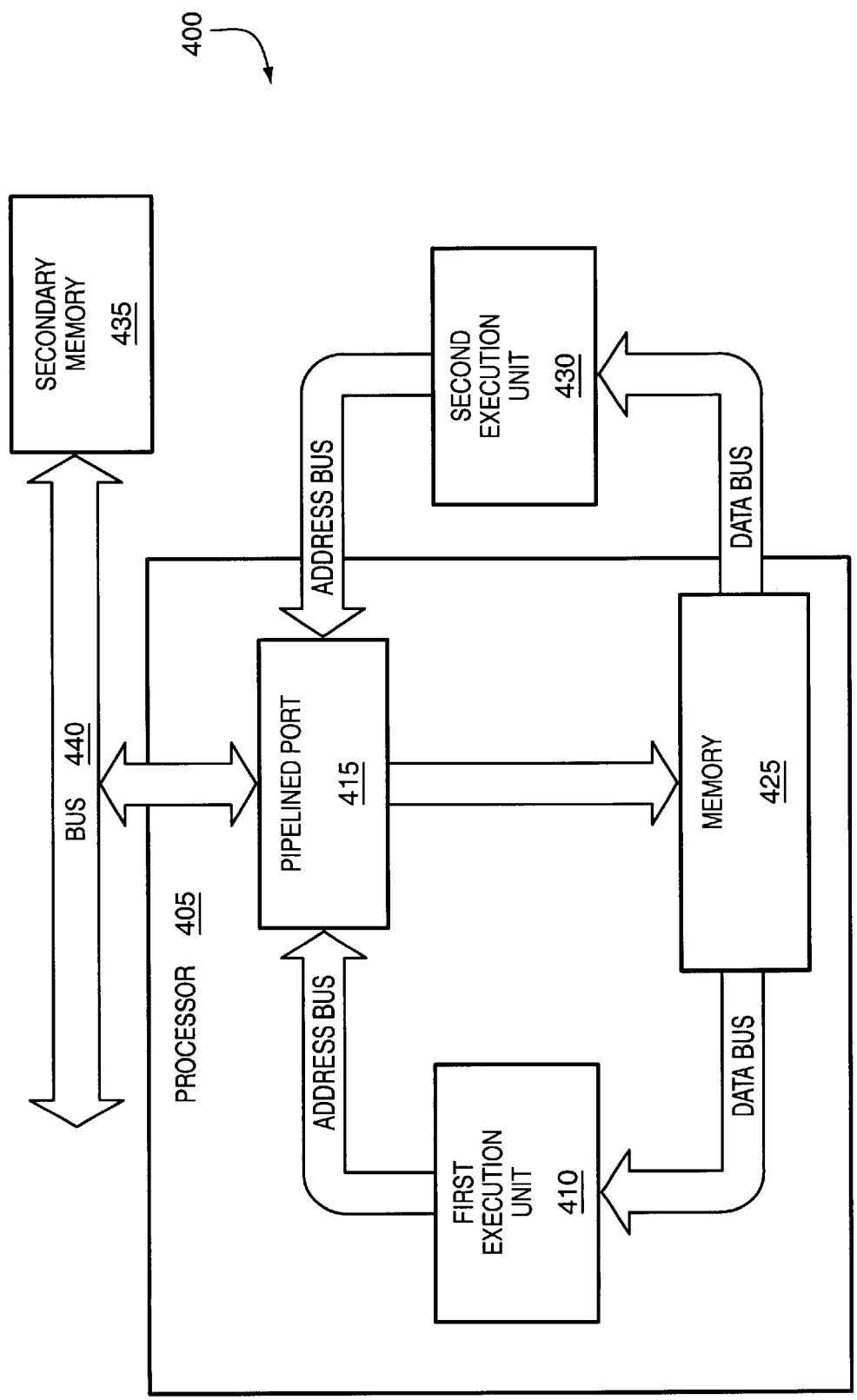
FIG. 7 is a block diagram of an embodiment for processing ordered data requests from several execution units.

FIG. 7 illustrates an embodiment of a data processing system 400 for ordered memory requests from two execution units 410, 430. A processor 405 includes the first execution unit 410, a pipelined data-request port 415, and a memory 425. The pipelined request port 415 handles data requests to the memory 425. Both the first and second execution units 410, 430 can issue data requests to the memory 425 via the pipelined request port 415. The data requests from each of the execution units 410, 430 are ordered with respect to themselves. In some embodiments the data requests from the first execution unit 410 are unordered with respect to the data requests from the second execution unit 430. In some embodiments, the first and second execution units 410, 430 belong to the same processor 405. In other embodiments, the second execution unit 430 is a separate processor. The pipelined data-request port 415 may process a plurality of data requests in which a portion of the requests are ordered and a portion of the requests are unordered.

Still referring to FIG. 7, the pipelined request port 415 processes data requests according to the methods illustrated in FIGS. 4A and 4B. Prefetches generated in response to ordered data requests that are misses in the memory 425, retrieve data from a secondary memory 435. The pipelined port 415 transmits prefetch requests to the secondary memory 435 via a bus 440 and retrieves prefetched data via the bus 440 to be stored in the memory 425. In some embodiments, the bus 440 is a system bus that also transmits signals between other hardware structures (not shown). Prefetches to the secondary memory 435 may be slower than data requests to the memory 425 in part due to the slow speed of transactions over the bus 440 and in part due to the slower speed of the secondary memory 435. In some embodiments, the secondary memory 435 may be an off-processor 405 memory while the memory 425 may be an internal cache memory.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
   issuing a plurality of data requests to a data request port for a first memory, the plurality of data requests including at least two ordered data requests;
   determining if an earlier one of the ordered data requests corresponds to a miss in the first memory;
   converting a later one of the ordered data requests to a prefetch in response to the earlier one of the ordered data requests corresponding to a miss in the first memory;
   converting other ordered data requests to prefetches in response to the earlier one of the ordered data requests corresponding to a miss in the first memory, the other ordered data requests being later than the earlier one of the ordered data requests; and
   flushing a portion of the ordered data requests from the port in response to:
   the earlier one of the ordered data requests corresponding to a miss in the first memory, and
   the portion of the ordered data requests being issued to the port later than the later one of the ordered data requests.

2. The method of claim 1, wherein the earlier and the later ones of the ordered data requests are earlier and later with respect to an ordering relationship for data requests.

3. The method of claim 1, further comprising:
reissuing a portion of the ordered data requests to the first memory, the portion of the ordered data requests having been converted to prefetches.

4. The method of claim 1, wherein the act of converting the later one of the ordered data requests is performed if the later one of the ordered data requests is received by the data request port in the same clock cycle as the earlier one of the ordered data requests.

5. The method of claim 1, wherein the act of converting the later one of the ordered data requests is performed in response to the later one of the ordered data requests corresponding to a first memory miss.

6. The method of claim 1, further comprising issuing the earlier and the later ones of the data requests from a data requester adapted to receive requested data in the order of issuance.

7. The method of claim 1, further comprising completing an unordered one of the data requests in response to the earlier one of the ordered data requests corresponding to a miss in the first memory.

8. The method of claim 1, wherein the earlier one of the ordered data requests must be completed prior to completion of the later one of the ordered data requests.

9. A machine readable medium having stored thereon data representing sequences of instructions that, when executed by a processor, cause the processor to perform operations comprising:
issuing a plurality of data requests to a data request port for a first memory, the plurality of data requests including at least two ordered data requests;
determining if an earlier one of the ordered data requests corresponds to a miss in the first memory;
converting a late one of the ordered data requests to a prefetch in response to the earlier one of the ordered data requests corresponding to a miss in the first memory;
converting the ordered data requests to prefetches in response to the earlier one of the ordered data requests corresponding to a miss in the first memory, the ordered data requests being later than the earlier one of the ordered data requests; and
flushing a portion of the ordered data requests from the port in response to:
the earlier one of the ordered data requests corresponding to a miss in the first memory, and
the portion of the ordered data requests being issued to the port later than the later one of the ordered data requests.

10. The medium of claim 9, wherein the earlier and the later ones of the ordered data requests are earlier and later with respect to an ordering relationship for data requests.

11. The medium of claim 9, wherein the sequences of instructions further comprise instructions that, when executed by the processor, cause the processor to perform operations comprising:
reissuing a portion of the ordered data requests to the first memory, the portion of the ordered data request having been converted to prefetches.

12. The medium of claim 9, wherein the sequences of instructions for converting cause the processor to perform the act of converting the later one of the ordered data requests if the later one of the ordered data requests is received by the data request port in the same clock cycle as the earlier one of the ordered data requests.

13. The medium of claim 9, wherein the sequences of instructions for converting cause the processor to perform the act of converting the later one of the ordered data requests in response to the later onr of the ordered data requests corresponding to a first memory miss.

14. The medium of claim 9, wherein the sequences of instructions further comprise instructions that, when executed by the processor, cause the processor to perform operations comprising issuing the earlier and the later ones of the data requests from a data requester adapted to receive requested data in the order of issuance.

15. The medium of claim 9, wherein the sequences of instructions further comprise instructions that, when executed by the processor, cause the processor to perform operations comprising completing an unordered one of the data requests in response to an earlier one of the ordered data requests corresponding to a miss in the first memory.

16. The medium of claim 9, wherein the earlier one of the ordered data requests must be completed prior to completion of the later one of the ordered data requests.

* * * * *

UNITED STATES PATENT AND TRADEMARK OFFICE
CERTIFICATE OF CORRECTION

PATENT NO. : 6,381,678 B2
DATED : April 30, 2002
INVENTOR(S) : Fu et al.

It is certified that error appears in the above-identified patent and that said Letters Patent is hereby corrected as shown below:

<u>Column 5,</u>
Line 66, delete "determined to a cache memory hit" and insert -- determined to be a cache memory hit --.
Lines 66-67, delete "is not be converted to a" and insert -- is not converted to a --.

<u>Column 7,</u>
Line 22, delete "that which could be" and insert -- that could be --.

Signed and Sealed this

Twenty-seventh Day of August, 2002

Attest:

Attesting Officer

JAMES E. ROGAN
*Director of the United States Patent and Trademark Office*